(12) United States Patent
Gialis et al.

(10) Patent No.: US 10,172,300 B2
(45) Date of Patent: Jan. 8, 2019

(54) DOUBLE-STREAM STRIPPING DEVICE

(71) Applicant: PELLENC, Pertuis (FR)

(72) Inventors: Jean-Marc Gialis, Cheval Blanc (FR); Christian Soulier, La Tour d'Aigues (FR)

(73) Assignee: PELLENC, Pertuis (FR)

( * ) Notice: Subject to any disclaimer, the term of this patent is extended or adjusted under 35 U.S.C. 154(b) by 194 days.

(21) Appl. No.: 14/549,582

(22) Filed: Nov. 21, 2014

(65) Prior Publication Data

US 2015/0164005 A1 Jun. 18, 2015

(30) Foreign Application Priority Data

Dec. 13, 2013 (FR) ..................................... 13 62586

(51) Int. Cl.
*A01G 17/02* (2006.01)

(52) U.S. Cl.
CPC ................... *A01G 17/026* (2013.01)

(58) Field of Classification Search
CPC ...... A01G 17/00; A01G 17/02; A01G 17/026; A01B 41/00; A01B 41/04
See application file for complete search history.

(56) References Cited

U.S. PATENT DOCUMENTS

| 2,929,188 A * | 3/1960 | Talkington, Sr. ...... | A01D 46/08 56/30 |
| 3,621,586 A * | 11/1971 | Meyer ................... | F26B 13/103 34/60 |
| 4,087,937 A * | 5/1978 | Meader .................. | A01H 1/025 47/1.41 |
| 4,835,880 A * | 6/1989 | Vecchia ................. | F26B 13/16 34/115 |
| 5,630,596 A * | 5/1997 | Rudolph ................ | A63C 17/06 188/17 |
| 7,096,654 B2 | 8/2006 | Pellenc | |

(Continued)

FOREIGN PATENT DOCUMENTS

| EP | 0 998 847 | 5/2000 |
| FR | 2 842 069 | 1/2004 |

(Continued)

OTHER PUBLICATIONS

French Search Report dated Aug. 25, 2014, corresponding to the Foreign Priority Application No. 1362586.

*Primary Examiner* — Thanh Pham
(74) *Attorney, Agent, or Firm* — Young & Thompson

(57) ABSTRACT

A double-stream stripping device, intended for the stripping of leaves from the vine, includes at least one stripping head (1) equipped with two counter-rotating drums (2) and (3), namely a first perforated (2*a*) drum (2) and a second drum (3) working in rotation with the first drum (2), a suction system (4) capable of creating negative air pressure in the first drum (2) and a system for driving drums (2) and (3) in rotation. The suction system includes two main suction openings and a turbine system and channeling elements (8, 9) making it possible to connect the latter to the main suction openings. Each open free end of the first drum is connected at one of the main suction openings in such a way as to create negative pressure, with a double air stream, constant and uniform, in the first drum, essentially over its entire length.

17 Claims, 5 Drawing Sheets

(56) References Cited

U.S. PATENT DOCUMENTS

| | | | | |
|---|---|---|---|---|
| 2003/0167746 A1* | 9/2003 | Pellenc | ................ | A01G 17/026 56/330 |
| 2005/0081501 A1 | 4/2005 | Pellenc | | |
| 2007/0129122 A1* | 6/2007 | Pieroth | ................ | A01G 17/026 460/112 |
| 2013/0031743 A1* | 2/2013 | Hawkins | ................... | A47L 5/28 15/347 |

FOREIGN PATENT DOCUMENTS

| | | |
|---|---|---|
| FR | 2 897 752 | 8/2007 |
| WO | 2005022985 | 3/2005 |

* cited by examiner

DOUBLE-STREAM STRIPPING DEVICE

FIELD OF THE INVENTION

This invention relates to the field of viticulture and more particularly the vine-stripping machines, and it has as its object a double-stream stripping device.

BACKGROUND OF THE INVENTION

It is known that in the specific field of the vine, it is very important, and even crucial, to reduce the quantity of leaves present in the fruit-bearing zone of vine plants, and this is done several times per season for the purposes of promoting or achieving the following objectives:
  The aeration of grape bunches to limit the appearance of rot and to accelerate their drying,
  The exposure of grape bunches to the sun for accelerating and improving their maturation, in particular the coloring (thicker skin of the grape),
  The penetration of phytosanitary treatments for improving their effectiveness,
  Manual clearing or harvesting to ensure better visibility of bunches and a singularly reduced labor time,
  If necessary, mechanical harvesting by a limitation of green waste in harvesting and the loss of juice due to the suction of leaves,
  Having respect for the grape bunches regardless of their degree of maturation.

The stripping of vines has been done manually for many years and although this is still sometimes the case, it is currently generally done mechanically using machines provided for this purpose.

However, although these machines have made it possible to provide numerous solutions making it possible to facilitate the vine-stripping operations, they do not make it possible to ensure an optimal stripping quality to meet the above-mentioned objectives.

Such machines are described and illustrated in particular in the following documents.

The document WO 2005022985 has as its object a stripping device comprising a chamber whose proximal end rests on the plant carpet, and its opposite distal end comprises a turbine sucking in the leaves at the proximal end that are then clamped by two rollers driven by a counter-rotating movement, i.e., each rotating in a direction opposite to the one of the other roller, so as to exert an adequate force for detaching the leaf.

However, with a device of the type of the one described in the document WO 2005022985, the suction of the plant carpet is hampered by the presence of rollers that form a screen to the stream of air sucking in the leaves, which requires a significant suction power generating a high energy cost. In addition, with such a device, the grape bunches can be sucked in or damaged. In addition, all of the waste passes through the turbine, clogging the blades of the latter and reducing its suction yield.

The general technical principle used in a large majority of these machines thus relies on a suction of leaves by a suctioning-in air stream generated by, or associated with, a suction system from a single turbine, and then on a cutting and evacuation of the latter. Such machines are described in particular in the following documents:

The document FR 2 842 069 relates to a stripping machine intended for the selective stripping of the vine comprising at least one stripping head equipped with a rotating drum comprising a perforated cylindrical side wall made of a flexible and deformable material and connecting its two free ends to means for driving the latter in rotation, a suction turbine making it possible to generate a suctioning-in air stream through the perforated wall, and a deflector for channeling the air stream and whose shape is determined for optimizing the suction yield. The suction turbine is placed at one of the ends or on top of the drum along a shaft that is parallel to the shaft of the latter or vertical. With this stripping machine, the leaves are then flattened on the side wall of the drum and then directed to a cutting device making it possible to sever them close to the branch of the vine.

However, with a stripping machine of the type of the one described in the document FR 2 842 069, the position of the turbine does not make possible here a uniform suction and flattening of the leaves along the rotary drum.

The document FR 2 897 752 has as its object a stripping machine comprising a head equipped with two counter-rotating drums, namely a first perforated drum and a second drum working with said first drum that comprises suction means at one of its ends in such a way as to be able to suck in the leaves of the plant carpet with which it is in contact. The leaves are then clamped between the two counter-rotating drums and detached from their branches.

However, with a machine of the type of the one of the document FR 2 897 752, the suction of the leaves is not done uniformly from one side to the other of the drum, i.e., the suction at the end opposite to the one comprising the suction means is weaker, which does not make it possible to achieve an effective suction over the entire length of the first drum and, starting, an effective inlay of the vine leaves over the entire length of this drum. Thus, numerous leaves are not clamped or are poorly clamped between the two counter-rotating drums, which does not make it possible to ensure an optimal quality of the stripping.

In addition, with the systems of the prior art such as those that are the object of the above-referenced documents and that comprise a head equipped with drums, it is difficult to conceive making the stripping head reversible relative to its longitudinal shaft that is parallel to the drums, i.e., to be able to orient the latter in the opposite direction by inverting it, i.e., by making it pivot by 180°, from its basic position, in the plane containing its longitudinal shaft. Actually, taking into account the variable air suction over the height or along the perforated drum making possible the inlay of leaves, these systems cannot make it possible to achieve a uniformity of work when the stripping head is thus inverted or made to go backwards, relative to its longitudinal shaft that is parallel to the shafts of the drums, to carry out in particular stripping in an opposite vine row.

SUMMARY OF THE INVENTION

This invention has as its object to remedy these drawbacks by proposing a double-stream stripping device that makes it possible to achieve an optimal quality of stripping, either in a basic position or inverted position.

For this purpose, the double-stream stripping device, more particularly intended for the stripping of leaves from the vine, which comprises at least one stripping head equipped with two counter-rotating drums, namely a first drum comprising a perforated cylindrical side wall connecting its two free ends and a second drum able to work in rotation with the first drum, an air suction system capable of creating negative air pressure in said first drum and a system for driving drums in rotation, is characterized essentially in that the two free ends of the first drum are open, in that the suction system comprises, on the one hand, two main suction openings, namely a first main suction opening and a second main suction opening, and, on the other hand, a turbine system and air channeling means making it possible to connect the latter to said main suction openings, and in that each open free end of the first drum is connected at one of said main suction openings in such a way as to generate, using said turbine system, two air suction streams in the first drum, one passing through one of said openings and the other passing through the other opening, having the effect of creating together a negative pressure, with double air streams, uniform overall in said first drum, essentially over its entire length, and in that it comprises a power plant system, comprising at least one motor, capable of actuating the drive system and the turbine system.

Such a device according to this invention makes it possible to improve significantly the quality of the inlay of vine leaves over all or almost all of the length of the first drum or perforated drum when the latter is in contact with the plant carpet inducing a more effective clamping between the two drums than with the known machines.

It is well understood that the term turbine, according to this invention, is defined as a means that makes it possible to generate negative air pressure and can consist of, for example, an axial fan, a centrifugal fan, a combination of these two techniques, or a number of fans combined in series and then driven by the same motor means.

BRIEF DESCRIPTION OF THE DRAWINGS

The invention will be better understood owing to the description below, which relates to a preferred embodiment, provided by way of nonlimiting example and explained with reference to the accompanying diagrammatic drawings, in which.

DETAILED DESCRIPTION OF THE INVENTION

Figure 1:
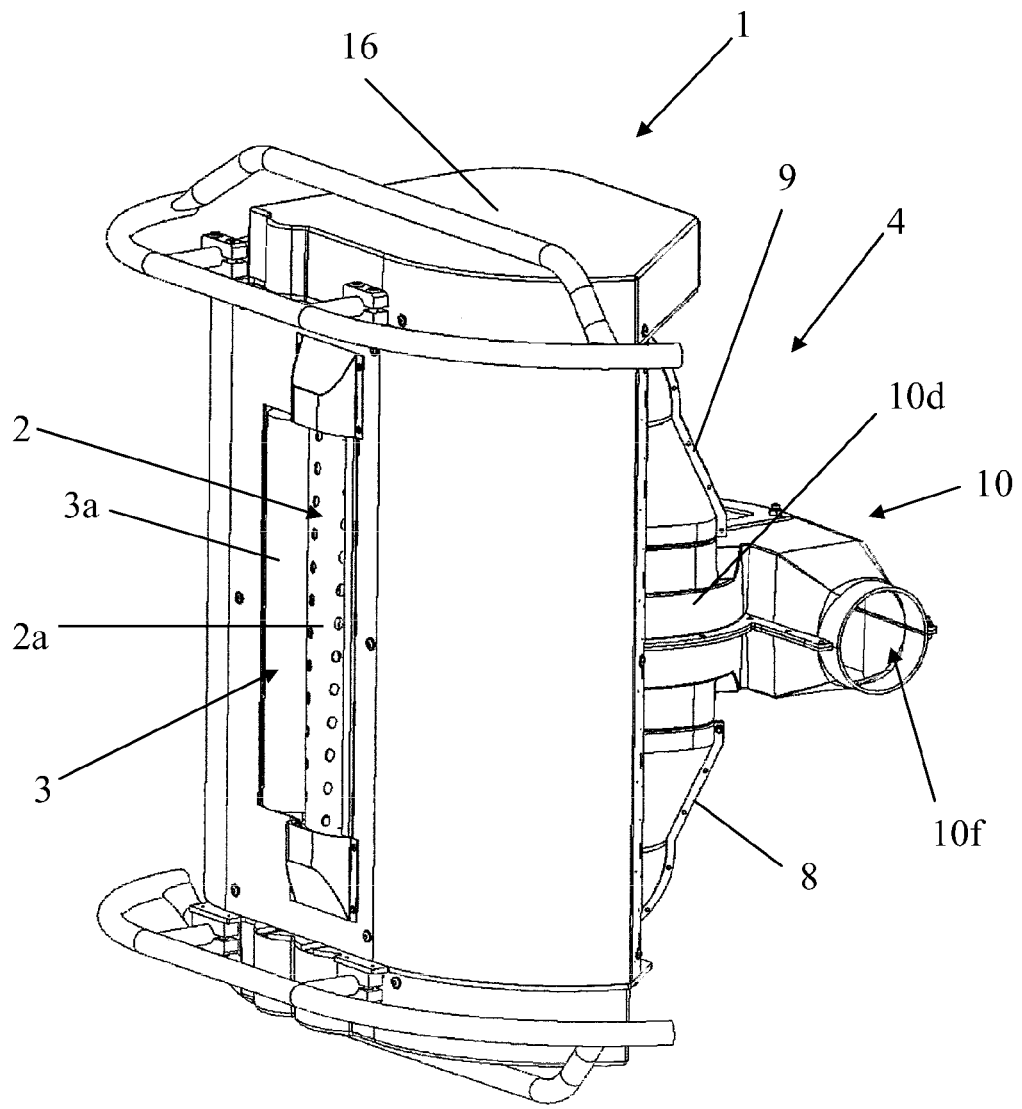
FIG. 1 shows a ¾ perspective view, front side, of a stripping device according to this invention in a preferred embodiment and in a preferred embodiment of the turbine system and the power plant system, and comprising a single stripping head.

The figures show a double-stream stripping device, more particularly designed for the stripping of leaves from the vine, comprising at least one stripping head 1 equipped with two counter-rotating drums 2 and 3, namely a first drum 2 comprising a perforated cylindrical side wall 2a connecting its two free ends and a second drum 3 that is able to work in rotation with the first drum 2, an air suction system 4 capable of creating negative air pressure in the internal space of the first drum 2, and a system 5 for driving drums 2 and 3 in rotation.

Figure 8:
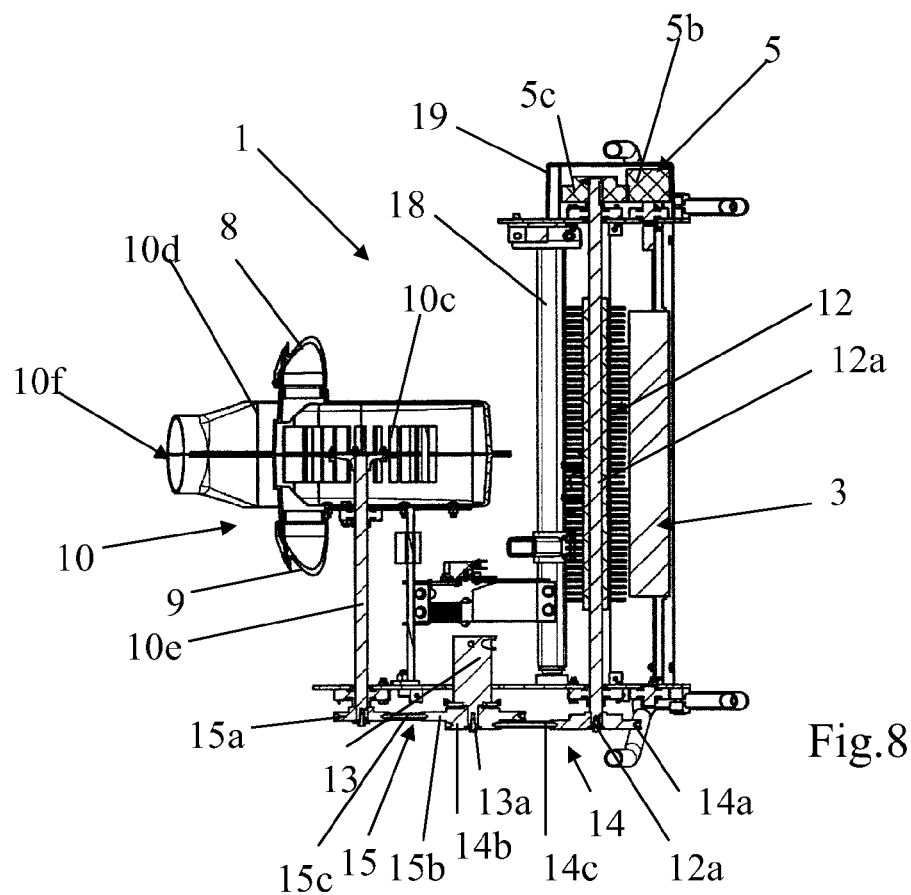
FIG. 8 shows a transverse cutaway view, along T-T, of the device shown in FIG. 3.

The second drum 3 can comprise a cylindrical side wall 3a (FIG. 1), preferably solid but that can be perforated, connecting its two free ends. It can also be a solid cylinder (FIG. 8).

Two counter-rotating drums 2 and 3 working together will be defined as two drums 2 and 3 that are capable of being actuated in rotation around their respective shafts 2b and 3b, each in a direction of reverse rotation or opposite to that of the other, for the purpose of allowing leaves to be detached by clamping the latter between the two drums 2 and 3.

In accordance with this invention, the two free ends of the first drum 2 are open, and the suction system 4 comprises, on the one hand, two main suction openings 6 and 7, namely a first main suction opening 6 and a second main suction opening 7, and, on the other hand, a turbine system 10 and channeling means 8, 9 making it possible to connect the latter to said main suction openings 6 and 7. In addition, each open free end of the first drum 2 is connected to one of said main suction openings 6 or 7 in such a way as to generate, owing to said turbine system, two air suction streams in the first drum 2, one passing through one of said openings and the other passing through the other opening, having the effect of creating together a negative pressure, with a double air stream, uniform overall in said first drum, essentially over its entire length, i.e., in a vertical orientation of the drum over its entire height.

Still in accordance with the invention, the device also comprises a power plant system, comprising at least one motor 13, capable of actuating the drive system 5 and the turbine system 10.

The—or each—motor 13 of the power plant system can be a hydraulic or electric motor or another drive motor.

Figure 7:
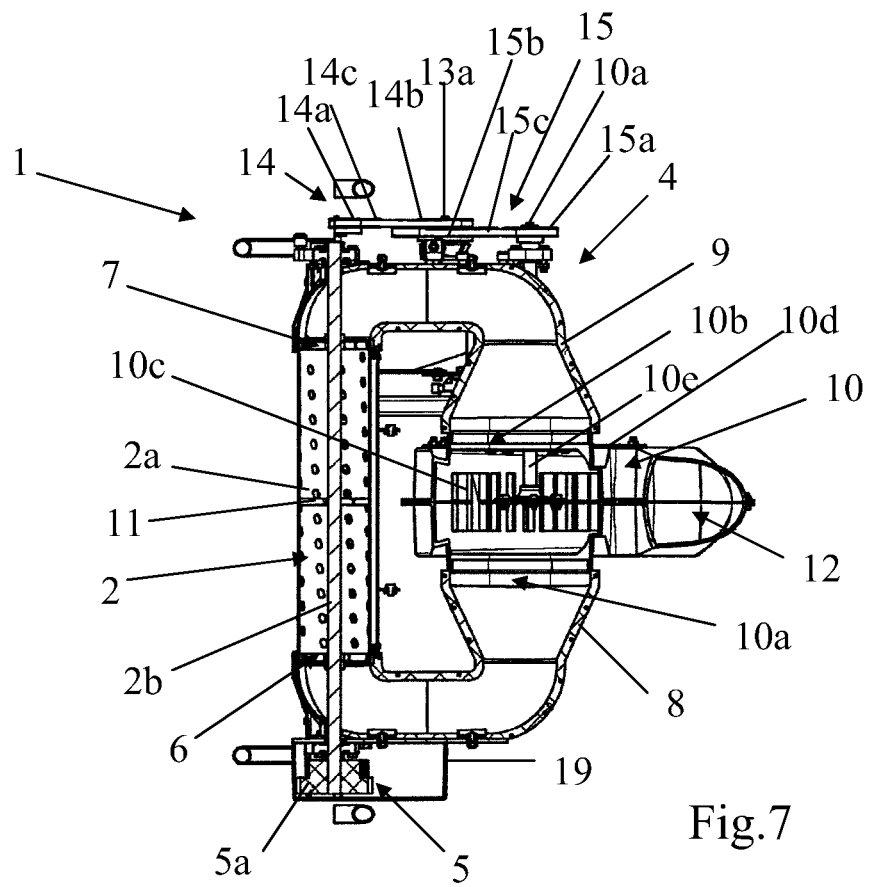
FIG. 7 shows a transverse cutaway view, along S-S, of the device shown in FIG. 6.

In a preferred embodiment of this invention, the turbine system 10 can comprise one or two suction turbines 10c actuated by the power plant system. For this purpose, the turbine system 10 can comprise two intermediate suction openings 10a and 10b, namely a first intermediate suction opening 10a and a second intermediate suction opening 10b, making it possible to connect the turbine system 10 respectively to the main suction openings 6 and 7 via the air channeling means 8, 9 (FIG. 7).

In a first embodiment as shown in the accompanying figures, the turbine system 10 can comprise a suction turbine 10c, i.e., a single turbine, which is common to the two main suction openings 6 and 7. The turbine system can then be provided, from negative air pressure created by said turbine, to generate the two air suction streams.

In a second embodiment, not shown, in the accompanying figures, the turbine system 10 can comprise two suction turbines 10c. The turbine system can then be provided, on the one hand, from negative air pressure created by one of said turbines, to generate one of the two air suction streams, and, on the other hand, from negative air pressure created by the other turbine, to generate the other suctioning-in air stream.

It will then be understood that in the case where the turbine system comprises a single turbine, the two air suction streams in the first drum are associated with a single turbine and in the case where the turbine system comprises two turbines, each suctioning-in air stream in the first drum is associated with one of the two turbines.

Figure 2:
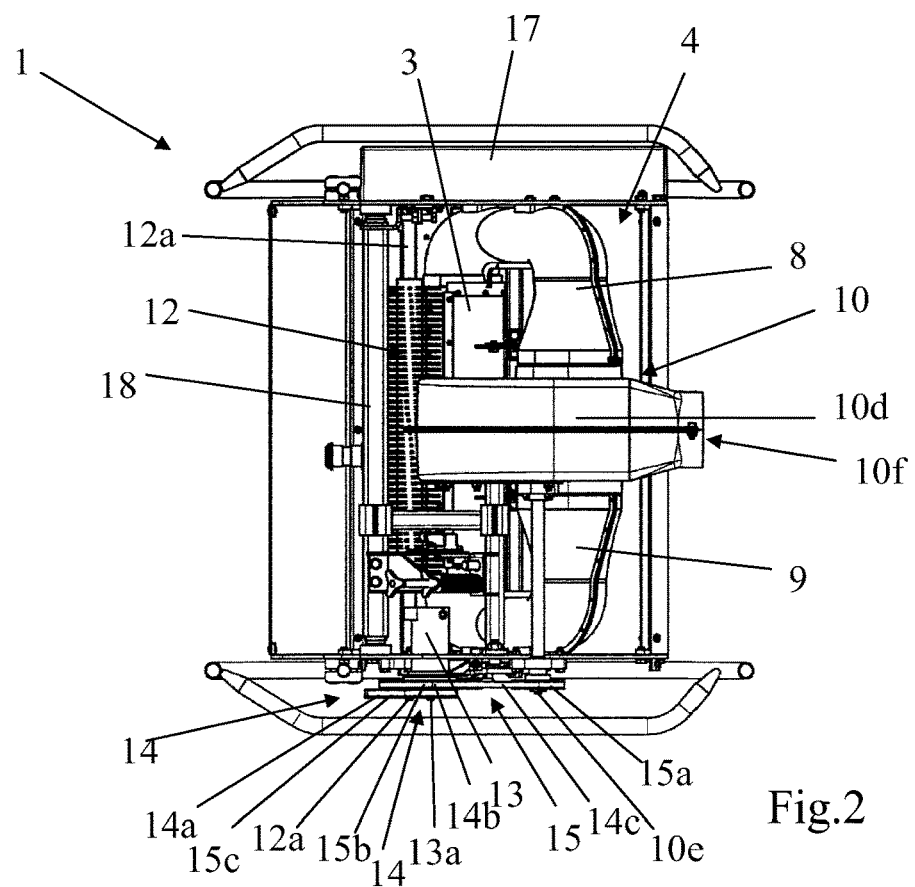
FIG. 2 shows a rear view of the device shown in FIG. 1, in a vertically inverted position.
Figure 3:
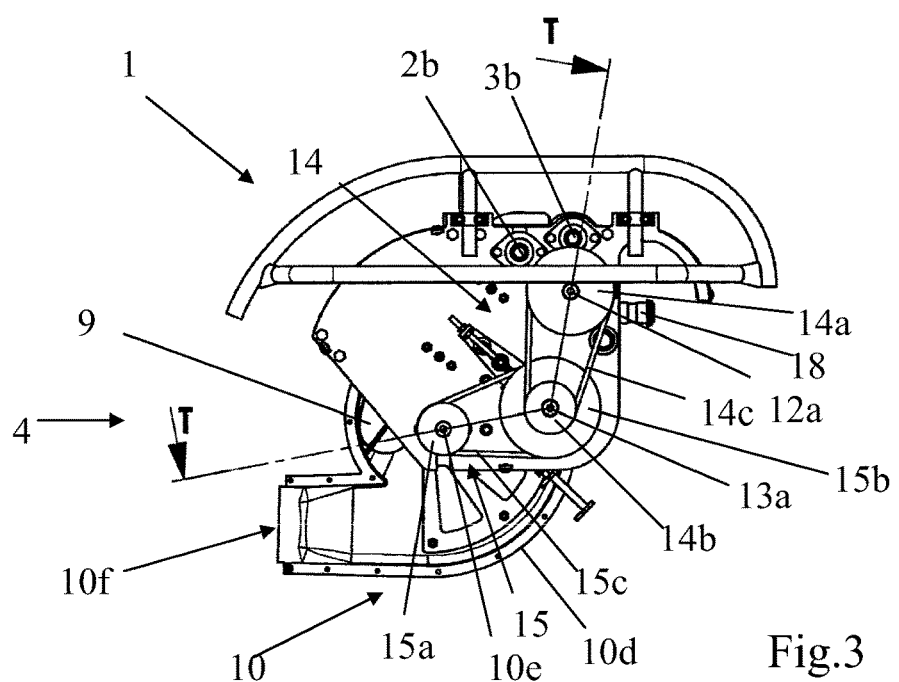
FIG. 3 shows a bottom view of the device shown in FIG. 2.
Figure 4:
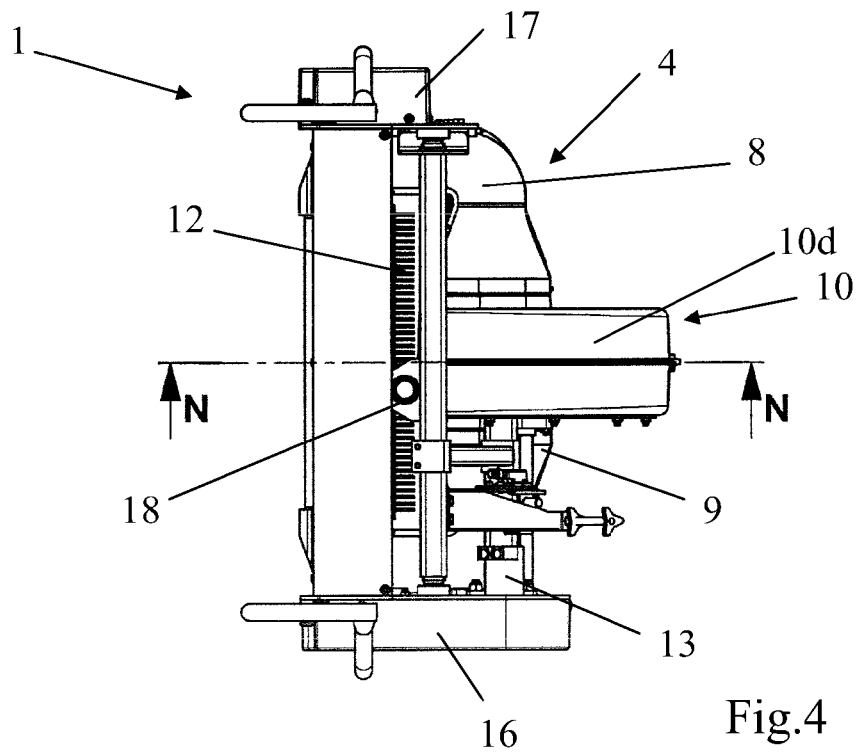
FIG. 4 shows a profile view of the device shown in FIG. 2, side opposite to the air discharge opening.

In a preferred embodiment of the power plant system, as can be seen in particular in FIGS. 2, 4, and 8, the latter can comprise a unique motor 13, i.e., a single motor that is capable, by itself, of actuating both the drive system 5 and the—or each—turbine 10c of the turbine system 10.

In a preferred embodiment of the air channeling means 8, 9, the latter can consist of two pipes 8 and 9, namely a first pipe 8, of which one of the ends can form, directly or indirectly, the first main suction opening 6 and the other end may be able to be connected to the first intermediate suction opening 10a and a second pipe 9, of which one of the ends can form, directly or indirectly, the second main suction opening 7 and the other end may be able to be connected to the second intermediate suction opening 10b (FIG. 7).

Preferably, the two pipes 8 and 9 can be of essentially identical length so as to preserve a balance of the suction loads between the two free ends of the first drum 2 connected to said respective pipes.

In a preferred form of the suction turbine 10c, the shaft 10e, i.e., the rotary shaft, of the latter can be provided to extend, preferably, essentially parallel to the respective shafts 2b and 3b of the drums 2 and 3 (FIGS. 3, 5, 6, 7, 8). Preferably, in the case where the turbine system comprises a suction turbine 10c, the latter can extend laterally in a plane perpendicularly cutting the shaft of the first drum 2 essentially equidistant between the free ends of the latter (see in particular FIGS. 7 and 8).

In the case where the turbine system 10 comprises a turbine, the latter can comprise a closed chamber 10d, and the suction turbine 10c can be housed in the chamber 10d that can comprise, on the one hand, two opposite walls extending on both sides of the suction turbine 10c preferably essentially perpendicular to the shaft 10e of the latter. In addition, the first intermediate suction opening 10a can be made in one of the opposite walls, and the second intermediate suction opening 10b can be made in the other opposite wall. On the other hand, an air discharge opening 10f can be made in one of said walls, or, preferably as can be seen in the figures, in another wall, preferably essentially perpendicular to said opposite walls (FIGS. 1, 2, 3 and 5).

In the case where the turbine system 10 comprises two turbines, the latter can comprise either a closed chamber, or, if necessary, two closed chambers that are independent of one another. In addition, each suction turbine can be housed either in the chamber, or, if necessary, in one of the two chambers. The—or each—chamber can be closed by a wall and either the first and second intermediate suction openings can be made in the wall of the chamber, or, if necessary, the first intermediate suction opening can be made in the wall of one of the two chambers and the second intermediate suction opening can be made in the wall of the other chamber. On the other hand, either an air discharge opening can be made in the wall of the chamber or, if necessary, two air discharge openings each can be made respectively in the wall of one of the two chambers.

Furthermore, this invention can advantageously provide that the first drum 2 comprises a separating partition 11, solid or perforated, extending, preferably transversely, into the inside space of the first drum 2, preferably by extending into a plane located essentially equidistant between the free ends of the first drum 2, in such a way as to separate said inside space into two suction spaces, preferably, if necessary, of essentially equal dimensions, each connected to one of the main suction openings 6 or 7. The separating partition 11 thus makes it possible to avoid or prevent the suction interactions of the two streams and to preserve the equilibrium of the suction loads of each side of the first drum 2 (FIG. 7). More particularly, the separating partition 11 makes it possible to avoid or to reduce the interactions between the two air suction streams leading to the pumping phenomenon, i.e., cyclic variation of the negative pressure in this zone leading to an uneven suctioning-in stream.

On the other hand, the device according to this invention can also comprise an ejector 12 that is suitable for making frictional contact with the first drum 2 and optionally with the second drum 3 to make possible the ejection of detached leaves by a relative displacement of the ejector 12 relative to said first drum 2, if necessary the second drum 3. The ejector 12 makes it possible to prevent the detached leaves from obstructing the first perforated drum 2 (FIGS. 2, 4 and 8) and to evacuate the leaves by simple gravity, preventing the clogging of the turbine or the fan.

In a preferred embodiment of the ejector 12, the latter can be an elongated element, preferably of an overall cylindrical shape, such as, for example, a rotary brush, and it can be mounted in rotation around a shaft 12a that preferably extends essentially parallel to the respective shafts 2b and 3b of the two drums 2 and 3. The ejector can be actuated in rotation using the drive motor or one of the drive motors 13 via the first drive means 14 (FIGS. 2, 4, 7, 8).

In a preferred form, the drive system 5 of the drums 2 and 3 is activated by the rotation of the ejector 12. Thus, the drums 2 and 3 can be actuated in rotation via the drive system 5, under the action of the rotation of the ejector 12 that is itself activated directly or indirectly by the motor or of one of the motors 13. In addition, preferably, the shaft 12a of the ejector 12 can be connected, by one of its ends, to the first drive means 14 and, by its other end, to the drive system 5 (FIGS. 7 and 8).

Figure 5:
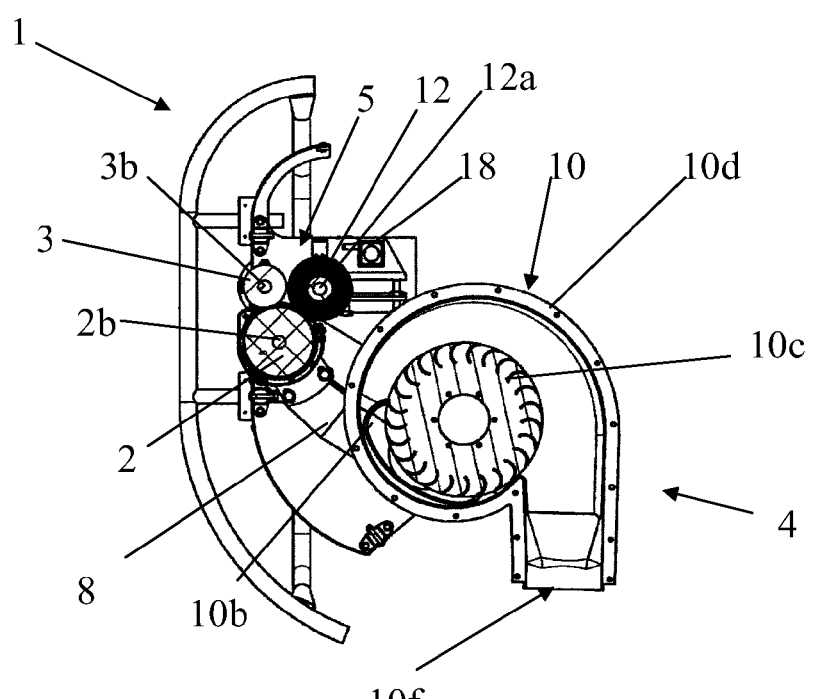
FIG. 5 shows a transverse cutaway view, along N-N, of the device shown in FIG. 4.
Figure 6:
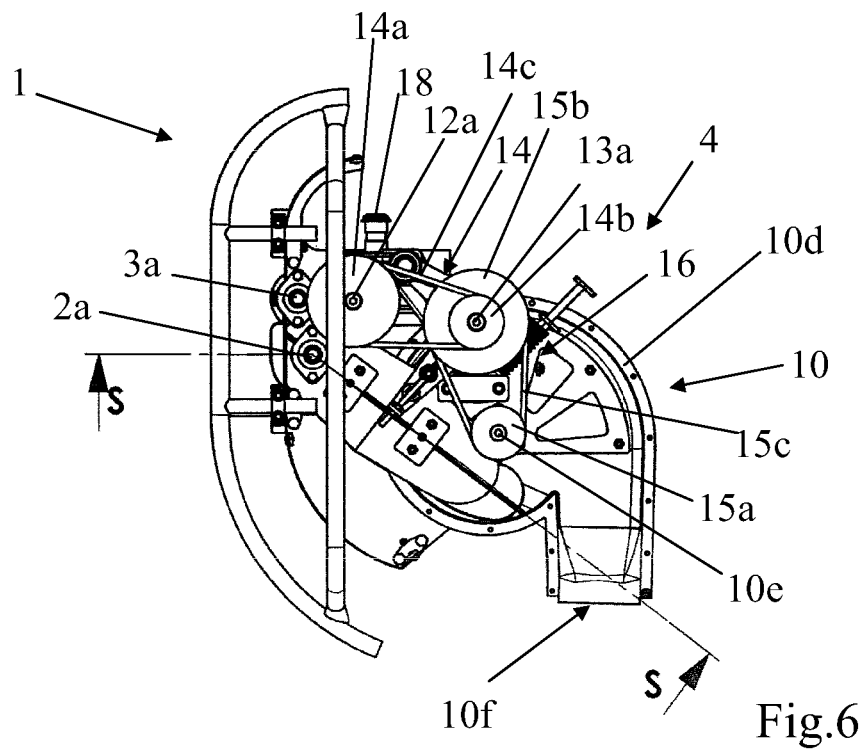
FIG. 6 shows a partial view of the device shown in FIG. 3.

Preferably, the drive system 5 can consist of a gear system with three cog-wheels 5a, 5b and 5c, namely a first cog-wheel 5a (FIG. 7) driving the rotary shaft 2b of the first perforated drum 2, a second cog-wheel 5b (FIG. 8) driving the rotary shaft 3b of the second drum 3, and a third cog-wheel 5c (FIG. 8) driven in rotation by the rotary shaft 12a of the ejector 12. In addition, the cog-wheels 5a, 5b and 5c can be engaged with one another in such a way as to make possible the transmission of the rotational movement from the ejector 12 to the two drums 2 and 3 (FIGS. 5 and 7).

Preferably, the shaft 10e of the—or of each—suction turbine 10c can be actuated in rotation by means of the motor or of one of the motors 13 actuating the ejector 12 and the drums 2 and 3; this is done by means of second drive means 15 (FIGS. 2, 3, 6, 7, 8).

The first drive means 14 making possible the driving in rotation of the ejector 12 can consist of two pulleys 14a and 14b, namely a first pulley 14a and a second pulley 14b, connected together by a first drive belt 14c. The first pulley 14a can be mounted axially on the shaft 12a of the ejector 12, and the second pulley 14b can be mounted axially on the shaft 13a of the motor or of one of the motors 13 (FIGS. 2, 3, 6, 7, 8).

The second drive means 15 making possible the driving in rotation of the shaft 10e of the—or of each—turbine 10 can consist of two additional pulleys 15a and 15b, namely a third pulley 15a and a fourth pulley 15b, connected together by a second drive belt 15c. The third pulley 15a can be mounted axially, directly or indirectly, on the shaft 10e of the—or of each—turbine 10, and the fourth pulley 15b can be mounted axially, directly or indirectly, on the shaft 13a of the—or of each—motor 13.

It will be understood that in the case of two turbines, the third pulley can be mounted directly on the shaft of the two turbines if their shafts are combined, or indirectly, for example, by means of one or more pulleys or another return element, on each shaft of the turbines if their shafts are not combined. It is the same for the fourth pulley 15b in the case where the power plant system comprises one or more motors.

It is also possible to see, in particular in FIGS. 1, 2 and 4, that this invention can provide two protective hoods 16 and 17 for protecting the different above-mentioned drive and gear means. For an example, a first hood 16 can be provided for protecting the first and second drive means 14 and 15, and a second hood 17 can be provided for protecting the drive system 5 of the drums 2 and 3.

As can be seen in all of the figures, such a device, according to this invention, can comprise a frame or another support structure 18 that makes it possible to support and to keep the constituent elements of said device in a suitable arrangement. It can also comprise two support plates 19 and 20 attached directly or indirectly to the frame 18 and making it possible to support in particular the shafts of 2b, 3b, 10e, 12a and 13a respectively of the first drum 2, the second drum 3, the suction turbine 10c, the ejector 12, and the motor or motors 13.

Such an arrangement can provide that the turbine system 10 is located essentially at the median shafts of the drums 2 and 3, and this in particular when this invention preferably provides that the first and second pipes 8 and 9 are essentially of the same length. This arrangement can also provide that the shaft of the outlet opening 10f extends essentially in the median plane of the turbine system 10. Preferably, it can provide that the median plane of the turbine system 10 transversely cuts the drums 2 and 3 essentially in their center. It can also provide that the first and second drive means 14 and 15 and the drive system 5 are preferably located on both sides of the unit consisting of the turbine system 10, drums 2 and 3, and pipes 8 and 9, i.e., at the two ends of said unit, along a shaft that is parallel to the rotary shafts of the drums 2 and 3. Each end of said unit can then comprise one of the two support plates 19 and 20.

Such an arrangement then makes it possible to offer a compact and economical device, while making possible a reversibility of the device that is both functional owing to two air streams originating from two suctioning-in cycles of air at each of the ends of the first drum 2 and visual owing to the overall symmetry obtained by said arrangement.

The stripping device according to this invention therefore makes it possible, in addition to the advantages already cited above, to obtain the following results and advantages, in particular relative to the current machines, such as, for example, those of the above-mentioned prior art:

Uniform stripping over the entire surface of the plant carpet in contact with the perforated drum or the first drum, A uniformity of work when the stripping device is inverted, i.e., pivoted by approximately 180° in an essentially vertical plane, for stripping the opposite row of vegetation and more particularly the vine, Improvement, owing to the reversibility of the device, of the cleaning of the head by eliminating in this operation the leaves that would have been able to accumulate in the machine, A suction power that is significantly lower than that required by the current systems and the prior art and in particular compared to the systems that implement suction through a grid with an axial fan, and this is accomplished owing to a suction surface that is reduced according to this invention, smaller than that of said systems, promoting the effectiveness and the quickness of the stripping.

Of course, the invention is not limited to the embodiment described and shown in the accompanying drawings. Modifications remain possible, in particular from the standpoint of the composition of various elements or by substitution of equivalent techniques, without thereby exceeding the scope of protection of the invention.

The invention claimed is:

1. A double-stream stripping device for stripping of leaves from a vine, said device comprising:
   at least one stripping head (1) equipped with a first drum (2) and a second drum (3), the first and second drums being counter-rotating drums,
   the first drum (2) comprising two ends and a perforated cylindrical side wall (2a) connecting the two ends, each of the two ends of the first drum being respectively a first open end and a second open end,
   the second drum (3) working in rotation with the first drum (2);
   a drive system (5) that drives the first and second drums (2) and (3) in rotation;
   an air suction system (4) that creates a negative air pressure in said first drum (2), wherein,
   the suction system (4) comprises
   i) two main suction openings (6, 7), the two main suction openings (6, 7) including a first main suction opening (6) and a second main suction opening (7),
   ii) a turbine system (10), and
   iii) an air channeling arrangement (8, 9) that connects the turbine system (10) to said first and second main suction openings (6, 7), wherein the first and second open ends of the first drum (2) are connected to a respective one of said first and second main suction openings (6, 7) to generate, using said turbine system, two simultaneous suctioning-in air streams in the first drum (2), a first suctioning-in air stream passing through the first open end and then into said first main suction opening (6) and a second suctioning-in air stream passing through the second open end and then into the second main suction opening (7), the first and second suctioning-in air streams having an effect of creating together the negative pressure, with double air streams, uniform overall in said first drum, essentially over an entire length of said first drum (2); and
   a power plant system, comprising at least one motor (13), that actuates the drive system (5) and the turbine system (10).

2. The device, according to claim 1, wherein,
   the turbine system (10) comprises at least one suction turbine (10c) actuated by the power plant system, and
   the turbine system (10) comprises two intermediate suction openings (10a, 10b), namely a first intermediate suction opening (10a) and a second intermediate suction opening (10b), the first and second intermediate suction openings connecting the turbine system (10) respectively to said first and second main suction openings (6, 7) via the air channeling arrangement (8, 9).

3. The device, according to claim 2, wherein the power plant system comprises a single motor (13) that, by itself, activates both the drive system (5) and the at least one suction turbine (10c) of the turbine system (10).

4. The device, according to claim 2, wherein a shaft (10e) of the at least one suction turbine (10c) extends essentially parallel to respective first and second shafts (2b, 3b) of the first and second drums (2, 3).

5. The device, according to claim 4, wherein the at least one suction turbine (10c) extends laterally in a plane perpendicularly cutting the first shaft (2b) of the first drum (2) essentially equidistant between the open ends of the first drum (2).

6. The device, according to claim 2, wherein,
said turbine system (10) comprises a closed chamber (10d), with the at least one suction turbine (10c) being housed in the closed chamber (10d),
the closed chamber comprises two opposite walls extending on both sides of said at least one suction turbine (10c), the two opposite walls being essentially perpendicular to a shaft (10e) of the at least one suction turbine (10c), the first intermediate suction opening (10a) is in one of said two opposite walls, and the second intermediate suction opening (10b) is in the other of said two opposite walls, and
an air discharge opening (10f) is located in one of said two opposite walls.

7. The device, according to claim 1, wherein,
the turbine system (10) comprises a single suction turbine (10c) having a first suction opening (10a) connected via a first channel (8) to the first main suction opening (6) and a second suction opening (10b) connected via a second channel (9) to the second suction opening (7), and
the turbine system provides, from negative air pressure created by said single suction turbine at the first and second suction openings (10a, 10b), the first and second suctioning-in air streams respectively in the first and second channels (8, 9).

8. The device, according to claim 1, wherein the air channeling arrangement (8, 9) comprises two pipes (8, 9), namely i) a first pipe (8) with a first end that forms the first main suction opening (6) and a second end that is connectable to the first intermediate suction opening (10a), and ii) a second pipe (9), with a first end that forms the second main suction opening (7) and a second end that is connectable to the second intermediate suction opening (10b).

9. The device, according to claim 8, wherein the first and second pipes (8, 9) are of essentially identical length.

10. The device, according to claim 1, wherein the first drum (2) comprises a separating partition (11), solid or perforated, extending transversely into an inside space of the first drum (2) in such a way as to separate said inside space into two suction spaces, each of said two suction spaces connected to a respective one of the first and second main suction openings (6, 7).

11. The device, according to claim 1, further comprising an ejector (12) that makes frictional contact with the first drum (2) and with the second drum (3) thereby allowing ejection of detached leaves by a relative displacement of the ejector (12) relative to said first drum (2).

12. The device, according to claim 11, further comprising an ejector driving system (14) comprised of at least one ejector drive motor, wherein,
wherein a shaft (10e) of the at least one suction turbine (10c) extends essentially parallel to respective first and second shafts (2b, 3b) of the first and second drums (2, 3),
the ejector (12) is an elongated element, of an overall cylindrical shape, mounted in rotation around a shaft (12a) that extends essentially parallel to respective first and second shafts (3a, 3b) of the first and second drums (2, 3), and
said elongated element is actuated in rotation using the at least one ejector drive motor of the ejector driving system.

13. The device, according to claim 12, wherein the shaft (10e) of the at least one suction turbine (10c) is actuated in rotation, directly or indirectly, by the at least one motor of the power plant system.

14. The device, according to claim 12, further comprising a further drive system (15), wherein the shaft (10e) of the at least one suction turbine (10c) is actuated in rotation, directly or indirectly, by the at least one motor of the power plant system via the further drive system (15).

15. The device, according to claim 12, wherein each of the first and second open ends of the first drum (2) is in fluid communication, via an internal space of the first drum (2), with perforations of the perforated cylindrical side wall (2a).

16. A double-stream stripping device for stripping of leaves from a vine, said device comprising:
at least one stripping head (1) equipped with a first drum (2) and a second drum (3), the first and second drums being counter-rotating drums,
the first drum (2) comprising two ends and a perforated cylindrical side wall (2a) connecting the two ends, each of the two ends of the first drum being respectively a first open end and a second open end,
the second drum (3) working in rotation with the first drum (2);
a drive system (5) that drives the first and second drums (2) and (3) in rotation;
an air suction system (4) that creates a negative air pressure in said first drum (2), wherein,
the suction system (4) comprises
i) two main suction openings (6, 7), the two main suction openings (6, 7) including a first main suction opening (6) and a second main suction opening (7),
ii) a turbine system (10), and
iii) an air channeling arrangement (8, 9) that connects the turbine system (10) to said first and second main suction openings (6, 7), wherein the first and second open ends of the first drum (2) are connected to a respective one of said main suction openings (6, 7) to generate, using said turbine system, two suctioning-in air streams in the first drum (2), a first suctioning-in air stream passing through the first open end and then into said first main suction opening (6) and a second suctioning-in air stream passing through the second open end and then into the second main suction opening, the first and second suctioning-in air streams having an effect of creating together a negative pressure, with double air streams, uniform overall in said first drum, essentially over an entire length of said first drum (2);
a power plant system, comprising at least one motor (13), that actuates the drive system (5) and the turbine system (10);
an ejector (12) that makes frictional contact with the first drum (2) and with the second drum (3) thereby allowing ejection of detached leaves by a relative displacement of the ejector (12) relative to said first drum (2); and
ejector driving system (14) comprised of at least one ejector drive motor, wherein,
wherein a shaft (10e) of the at least one suction turbine (10c) extends essentially parallel to respective first and second shafts (2b, 3b) of the first and second drums (2, 3),
the ejector (12) is an elongated element, of an overall cylindrical shape, mounted in rotation around a shaft (12a) that extends essentially parallel to the respective first and second shafts (3a, 3b) of the first and second drums (2, 3), and said elongated element is actuated in rotation using the at least one ejector drive motor of the ejector driving system, and wherein the drive system (5) is activated by the rotation of the ejector (12), with a first end of the shaft (12*a*) of the ejector (12) being connected to the ejector driving system (14), and with a second end of the shaft (12*a*) of the ejector (12) being connected to said drive system (5).

17. The device, according to claim 16, wherein, the drive system (5) comprises a gear system with three cog-wheels (5*a*), (5*b*) and (5*c*), namely a first cog-wheel (5*a*) driving rotary shaft (2*b*) of the first drum (2), a second cog-wheel (5*b*) driving a rotary shaft (3*a*) of the second drum (3), and a third cog-wheel (5*c*) driven in rotation by the rotary shaft (12*a*) of the ejector (12), and said three cog-wheels (5*a*), (5*b*) and (5*c*) are engaged with one another to provide transmission of rotational movement from the ejector (12) to the first and second drums (2, 3).

* * * * *